(12) United States Patent
Grossmann (10) Patent No.: US 6,484,611 B1
(45) Date of Patent: Nov. 26, 2002

(54) LATHE

(75) Inventor: Walter Grossmann, Baltmannsweiler (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 21 days.

(21) Appl. No.: 09/630,217

(22) Filed: Aug. 1, 2000

(30) Foreign Application Priority Data

Aug. 3, 1999 (DE) .......................................... 199 36 468

(51) Int. Cl.[7] .............................. B23B 3/00; B23B 29/24
(52) U.S. Cl. .............................. 82/117; 82/120; 82/129; 82/121
(58) Field of Search ........................... 82/117, 118, 129, 82/120, 121, 158, 159, 161, 173

(56) References Cited

U.S. PATENT DOCUMENTS

| 5,191,817 A | * | 3/1993 | Mitsukuchi et al. ......... 82/1.11 |
| 5,429,020 A | | 7/1995 | Hack et al. |

FOREIGN PATENT DOCUMENTS

| DE | 3127130 A1 | 7/1981 | | |
| DE | 279429 A | 6/1990 | | |
| DE | 4229423 C3 | 9/1992 | | |
| EP | 0585690 A | 3/1994 | | |
| GB | 2103529 | 7/1982 | | |
| JP | 365501 | * 12/1992 | .................. | 82/129 |
| JP | 6-134602 | * 5/1994 | .................. | 82/129 |
| JP | 6-134603 | * 5/1994 | .................. | 82/129 |

OTHER PUBLICATIONS

European Search Report (Jun. 2002).

* cited by examiner

Primary Examiner—Henry Tsai
(74) Attorney, Agent, or Firm—Leydig, Voit & Mayer, Ltd.

(57) ABSTRACT

A lathe is provided which includes at least one workpiece spindle which is rotatable about a spindle axis. The lathe includes two tool carrier systems each comprising a slide system having at least a Z slide and a X slide and further comprising a tool carrier. The tool carrier system is movable relative to the machine frame in a Z direction parallel to the spindle axis. Each of the tool carrier systems is guided independently of the other respective tool carrier system with its own Z slide in the Z direction on the machine frame. The tool carrier systems are arranged on the same side of the spindle axis and each tool carrier system is movable in the Z direction on a path extending towards the other tool carrier system. Each slide system has a guide plane for the X slide defined by a X guide.

27 Claims, 5 Drawing Sheets

LATHE

The invention relates to a lathe comprising a machine frame, at least one workpiece spindle arranged on the machine frame and rotatable about a spindle axis, two tool carrier systems movable relative to the machine frame in a Z direction parallel to the spindle axis and comprising tool carriers for several tools, each of these tool carrier systems being guided independently of the other respective tool carrier system so as to be movable with its own slide system in the Z direction on the machine frame.

Lathes of this type are known from the state of the art, wherein these lathes are either not suitable for the machining of shafts with two tool carrier systems and or the two tool carrier systems cannot be used at the same time in an optimum manner.

The object underlying the invention is therefore to improve a lathe of the type described at the outset in such a manner that machining of a shaft with optimum use of two tool carrier systems is possible.

This object is accomplished in accordance with the invention, in a lathe of the type described at the outset, in that the tool carrier systems are arranged on the same side of the spindle axis and each tool carrier system is thereby movable in the Z direction on a path which extends to the other tool carrier system in a collision-prone manner and that each tool carrier system has a tool carrier head which can be positioned in a first position in relation to the respective slide system such that this represents the structural component of the respective tool carrier system located closest to the other tool carrier system.

With the inventive solution, the possibility is thus created, by way of the advantageous possibility of the arrangement of the tool carrier head in the first position, of being able to use the tool carrier heads in an optimum manner since they can essentially be moved towards one another until immediately prior to a collision and thus the tools can be used close to one another and so an optimum operating area is available for each tool carrier system.

Alternatively or in addition to the inventive solution described at the outset, one particularly advantageous embodiment provides for the tool carrier systems to be arranged on the same side of the spindle axis and each tool carrier system to thereby be movable in the Z direction on a path which extends to the other tool carrier system in a collision-prone manner, and for each slide system to have an X slide which is guided on the Z slide and is arranged on a side of the Z slide facing the other tool carrier system.

A particularly favorable arrangement of the X slide provides for a guide plane, in which the X guide means for the movement of the X slide relative to the Z slide are located, to be located on a side, which faces the respectively other tool carrier system, of a guide element of the Z slide located closest to the respectively other tool carrier system.

With this solution it is ensured that the guide plane for the X slide is displaced to such an extent in the direction of the respectively other tool carrier system that the X guide means can be brought as close as possible to the Z guide means without hindrance by the guide elements of the Z slide in order to achieve as stable a guidance of the tools as possible by means of the X slide and the Z slide relative to the machine frame which ensures as great a precision of the machining as possible.

In this respect, it is particularly favorable when the X slide of each of the slide systems extends beyond a Z slide guiding this X slide in the direction of the respectively other tool carrier system.

A particularly favorable development of the slide systems provides for the Z slide to have X guide means which are arranged on a slide member thereof in such a manner that they are located closer to the respectively other tool carrier system than the respective slide member.

With respect to the position of the guide plane determined by the X guide means, no further details have so far been given.

It is particularly favorable, for example, for as stable a guidance of the X slide as possible relative to the Z slide when the guide plane determined by the X guide means extends transversely to the spindle axis since sufficient space for a stable design of the guide means is available transversely to the spindle axis without any restriction of the path of action of the tool carrier systems in Z direction resulting from this.

With respect to the definition of the movability of the tool carrier systems in Z direction on a collision-prone path it would, for example, be conceivable not to have the slide systems movable on a collision-prone path but merely the tool carriers. Since collisions of the tool carriers have to be taken into consideration in any case, it is, with a view to a particularly stable guidance of both tool carriers, constructionally favorable when the slide systems of both tool carrier systems can be moved in the Z direction on a collision-prone path. The simplest possibility for realizing this provides for the slide systems to be movable in Z direction on the same guide paths.

In order to be able to position the tools as close to one another as possible, it is preferably provided for the tool carrier heads to be aligned in the first position in such a manner that their tool receiving means allow use of tools which extend in an area extending transversely to the spindle axis at a point of intersection with the spindle axis.

As a result of the fact that tools can be used which are located in an area which extends at the point of intersection with the spindle axis transversely thereto, it is possible to travel with the tool carriers of the different tool carrier systems as close as possible towards one another and thus to operate lying as near as possible to one another during turning of the shaft.

In this respect it is particularly expedient when the areas extending transversely to the spindle axis extend approximately parallel to one another at the point of intersection with the spindle axis.

In order to be able to equip the tool carrier heads with tools as favorably as possible, it is preferably provided for the tool carrier head to be arranged in the first position relative to the slide system supporting it in such a manner that the slide system forms a free space for the tools extending away from the tool carrier head approximately in directions transverse to the spindle axis. This applies for at least one of the tool carriers of the tool carrier systems.

Both tool carriers of the tool carrier systems are preferably arranged in the first position in such a manner.

This may be realized particularly favorably when the tool carrier head can be positioned in the first position relative to the slide system supporting it in such a manner that this projects beyond a side surface of the slide system located closest to the respectively other tool carrier system in the direction of the other tool carrier system.

In order to be able to carry out not only shaft machinings but also other machinings with the inventive lathe, it is preferably provided for a counterspindle to be provided so as to be located opposite the spindle so that each of the tool carrier systems can cooperate with one of the spindles for the machining of a workpiece.

In order to be able to carry out, in particular, machining on front and rear sides, it is preferably provided for the spindle and the counterspindle to be movable towards one another for the transfer of workpieces.

In principle, it is possible with the inventive solution to also carry out machining of the workpieces in the spindle and the counterspindle with one of the respective tool carrier systems with a tool carrier head located in the first position.

For this purpose, tools are preferably used which extend in areas transverse to the spindle axis or to both spindle axes.

In order, however, to be able to carry out machinings, in particular, on the end side of the workpieces and of recesses extending into the end side, it is necessary to also use tools which extend approximately parallel to the spindle axis.

For this purpose, it is particularly favorable when at least one of the tool carrier heads is located in a second position relative to the slide system supporting it on a side of the tool carrier facing away from the other tool carrier system. In this second position, tools which extend parallel to the spindle axis may be used in the tool carrier head particularly favorably.

For this purpose, it is, in particular, favorable when, in the area of the tool carrier head in the second position, the slide system forms a free space for tools extending approximately in the direction of the spindle axis, these tools then being able to extend in the opposite direction to the respectively other tool carrier system proceeding from the respective tool carrier head without collisions of these tools in the two tool carrier systems with one another needing to be feared.

In this respect, it is particularly favorable when the tool carrier head is located in the second position in front of a side of the slide system facing towards the side of the corresponding spindle.

In order to be able to move the tool carrier head from the first position into the second position, the most varied of solutions are conceivable. One particularly favorable solution, for example, provides for the respective tool carrier to be movable relative to the X slide in such a manner that the tool carrier head can be brought from the first position into the second position, i.e. the transfer of the tool carrier head between the first position and the second position is brought about by way of a relative movement of the tool carrier with respect to the X slide.

Such a movement may be realized in a particularly simple manner when the tool carrier head can be moved from the first position into the second position by way of a pivoting movement.

A particularly favorable solution from a constructional point of view provides for the tool carrier to be mounted on the X slide so as to be pivotable about an axis. Such an axis is preferably an axis extending transversely to the spindle axis.

A particularly preferred solution provides for this axis to extend at right angles to the spindle axis and represent a so-called B axis of the machine tool.

The tool carrier can, in principle, be of any optional design as long as it creates the possibility of bringing several tools into use. Such a tool carrier could, for example, in the simplest case be a so-called linear tool carrier.

A particularly favorable form of a tool carrier provides for the tool carrier to be designed as a tool turret.

In this respect, it is particularly favorable when the tool turret has a turret head which is arranged on one side of a turret housing.

Such a turret head is preferably pivotable about a turret axis in relation to the turret housing.

This turret axis is preferably located such that the turret head is pivotable in relation to the turret housing about a turret axis which extends transversely to an X axis of the machine tool.

In this respect, the turret axis could take up any optional number of positions about the X axis. The turret axis is located particularly favorably when it extends approximately parallel to the Z axis.

With respect to the pivotability of the turret head into the first and the second positions, it is preferably provided for the turret housing to be pivotable about a pivot axis in relation to the X slide.

In this respect, the pivot axis is preferably aligned such that it extends transversely to the Z axis. In this respect, the turret head can preferably be brought from the first position facing the other tool carrier system into the second position facing away from the other tool carrier system by way of pivoting of the turret housing about the pivot axis.

Additional features and advantages of the invention are the subject matter of the following description as well as the drawings illustrating one embodiment.

One embodiment of an inventive lathe, illustrated in FIGS. 1 to 5, comprises a machine frame 10 which comprises a base member 14 which extends in a longitudinal direction 12 and supports on a front side 16 in an end region a first workpiece spindle 18 which is rotatable about a spindle axis 20 approximately parallel to the longitudinal direction 12, wherein the first workpiece spindle 18 is preferably rigidly connected to the base member 14.

Furthermore, two Z guide means 24a, b extending at a distance and parallel to one another are provided on an upper side 22 of the base member 14, these Z guide means extending essentially over the entire length of the base member 14 and parallel to the longitudinal direction 12 and thus extending parallel to the spindle axis 20.

Two tool carrier systems 30, 40, which each comprise a Z slide 32, 42 seated directly on the Z guide means 24a, b and guided by them, are arranged on these Z guide means 24a, b.

The Z slides 32, 42 have a base part 34, 44, on which guide elements 36a, 38a, 36b, 38b and 46a, 48a, 46b, 48b, respectively, are arranged, wherein the guide elements 36a and 38a as well as 46a and 48a are guided on the Z guide means 24a and are arranged at a respective distance from one another on the respective base part 34 or 44 whereas the respective guide elements 36b, 38b or 46b, 48b are guided on the Z guide means 24b and are held at a respective distance from one another on the corresponding base part 34 and 44, respectively.

The Z slides 32, 42 further comprise a support member 52 and 62, respectively, which rises above the base part and is arranged to face the respectively other tool carrier system 40 or 30 and which extends essentially transversely to the respective base part 34 or 44 and, in addition, transversely to the Z guide means 24a, 24b. This support member 52 and 62, respectively, is preferably fixed in position via reinforcing means 54, 56 and 64, 66, respectively, so as to be essentially rigid against deformation in relation to the respective base part 34, 44, wherein the respective reinforcing means 54, 56 or 64, 66 preferably extend transversely to the base part 34 and to the corresponding support member 52 or to the base part 44 and to the corresponding support member 62 so that, altogether, a slide member 50 and 60, respectively, results which is preferably in one piece and comprises the respective base part 34 or 44, the respective support member 52 or 62 and the reinforcing means 54, 56 or 64, 66.

Two X guide means 70a, 70b and 80a, 80b, respectively, which are arranged parallel to one another and extend in a direction transverse to a plane $E_z$ determined by the Z guide means 24a, b, are provided on the respective support member 52 or 62 on the side 58 and 68, respectively, which faces the other respective tool carrier system 40 or 30 and extends transversely to the respective Z guide means 24a or 24b.

The two X guide means 70a, 70b and 80a, 80b are each preferably located in a plane E1 and E2, respectively, which extends at right angles to the Z guide means 24a, 24b and at right angles to the spindle axis 20.

An X slide 72 and 82, respectively, is guided on the respective X guide means 70a, 70b or 80a, 80b extending parallel to one another so as to be movable in X direction by means of guide elements 74a, 74b and 76a, 76b and 84a, 84b and 86a, 86b, respectively, wherein the X guide means 70a, 70b each preferably extend over the respective support member 52 or 62 essentially proceeding from a lower edge 78, 88 of the Z slide member 50, 60 so that the respective X slide 72 or 82 can be brought up as close as possible to the Z guide means 24a, b.

The X slides 72, 82 comprise a base member 92 and 102, respectively, on which a housing 94 and 104, respectively, is securely mounted. A turret housing 96 and 106, respectively, is held on this respective housing 94 or 104 so as to be pivotable about a pivot axis 98 and 108, respectively.

Each turret housing 96 or 106 is part of a respective tool turret 100 or 110 which has a respective turret head 114 or 124 which is rotatable on the respective turret housing 96 or 106 about a respective turret axis 112 or 122 and is provided with tool receiving means 116 and 126, respectively, on the circumferential side which extend in a radial direction to the respective turret axis 112 or 122 in the respective turret head 114 or 124.

As illustrated in FIGS. 1 and 3 or 2 and 4, the respective turret head 114 or 124 can be brought each time into at least two different positions preferably turned through 180° in relation to one another by pivoting the respective turret housing 96 or 106 about the respective pivot axis 98 or 108 relative to the respective housing 94 or 104.

In a first position of the turret heads 114 and 124 (FIGS. 1 and 2) these are located such that they are facing one another and can be moved towards one another by displacing the respective tool carrier systems 30 and 40 in Z direction to such an extent that the turret heads 114 and 124, respectively, almost strike one another. This is possible due to the fact that the respective slide systems comprising the respective Z slides 32 and 42 and the respective X slides 72 and 82 are arranged relative to the respective tool turrets 100 and 110 such that with tool turrets 100 and 110, respectively, in the first position sides 132 and 142 of the respective slide systems 32, 72 and 42, 82, which face and are located closest to the tool carrier system 40 or 30 located respectively opposite, are located such that the respective turret heads 114 and 124 are positioned in the direction of the respectively other tool carrier system 40 or 30 so as to be preferably located at a distance in front of these respective sides 132 and 142.

Thus, tools 134 and 144, respectively, inserted in the respective tool receiving means 116 or 126 are located in planes E3 and E4, respectively, which intersect the respective turret axes 112 and 122 essentially at right angles and, therefore, also intersect the spindle axis 20 of the tool spindle 18 at right angles, wherein the planes E3, E4 are likewise each located at a distance in front of the facing sides 132 and 142, respectively, of the respective slide systems 32, 72 and 42, 82.

Consequently, a free space 150 and 160, respectively, exists in the area of the planes $E_3$, $E_4$, extending azimuthally about the respective turret head 114 or 124, this space enabling a rotation of the respective turret heads 114 and 124 about the respective turret axis 112 or 122 to be carried out with the respective tools 134 and 144 extending radially to the respective turret axis 112 or 122 without the tools colliding with the respective X slide 72 or 82.

In addition, as a result of the fact that the planes E3 and E4 preferably extend parallel to one another the turret heads can be displaced in the direction towards one another to such an extent until their respective end sides 152 and 162 facing away from the respective turret housing 96 or 106 almost touch one another without the respective tools 134 and 144, which are inserted in the respective turret heads 114 and 124 and extend radially to the respective turret axes 112 and 122, colliding with one another.

Consequently, the tools 134 and 144 may be used whilst located near to one another and so machining of a shaft with two tools 134, 144 operating at the same time is possible, in particular, with the tools 134 and 144 of the two turret heads 114 and 124, wherein a headstock or, as illustrated in FIGS. 1 to 4, a counterspindle 158 used as a headstock is arranged so as to be located opposite the spindle 18, for example, when machining of a shaft is intended to be carried out on the inventive lathe.

Figure 1:
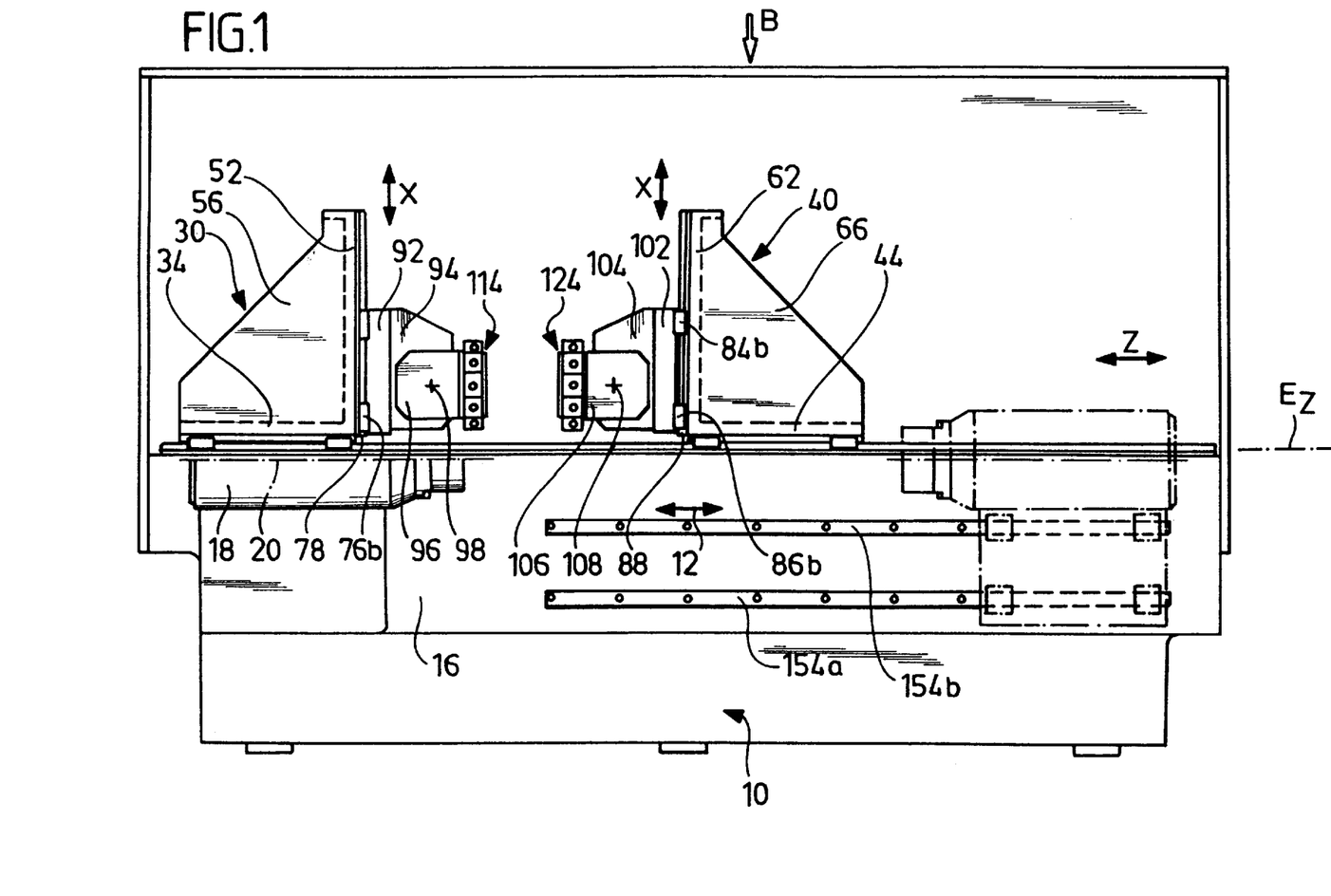
FIG. 1 shows a front view of one embodiment of an inventive lathe with a spindle partially broken open and in tool carrier heads located in a first position.
Figure 2:
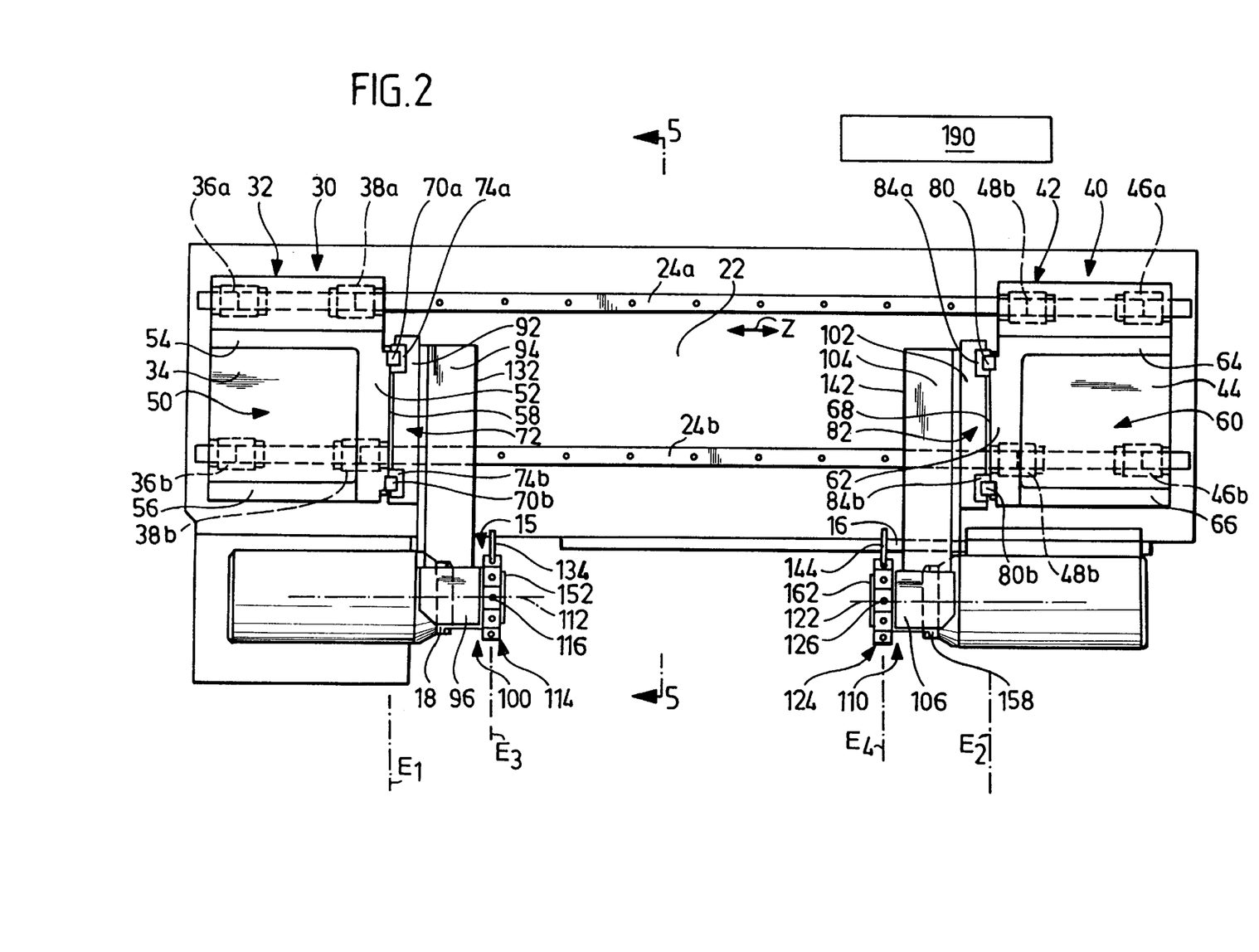
FIG. 2 shows a plan view in the direction of arrow B in FIG. 1.
Figure 3:
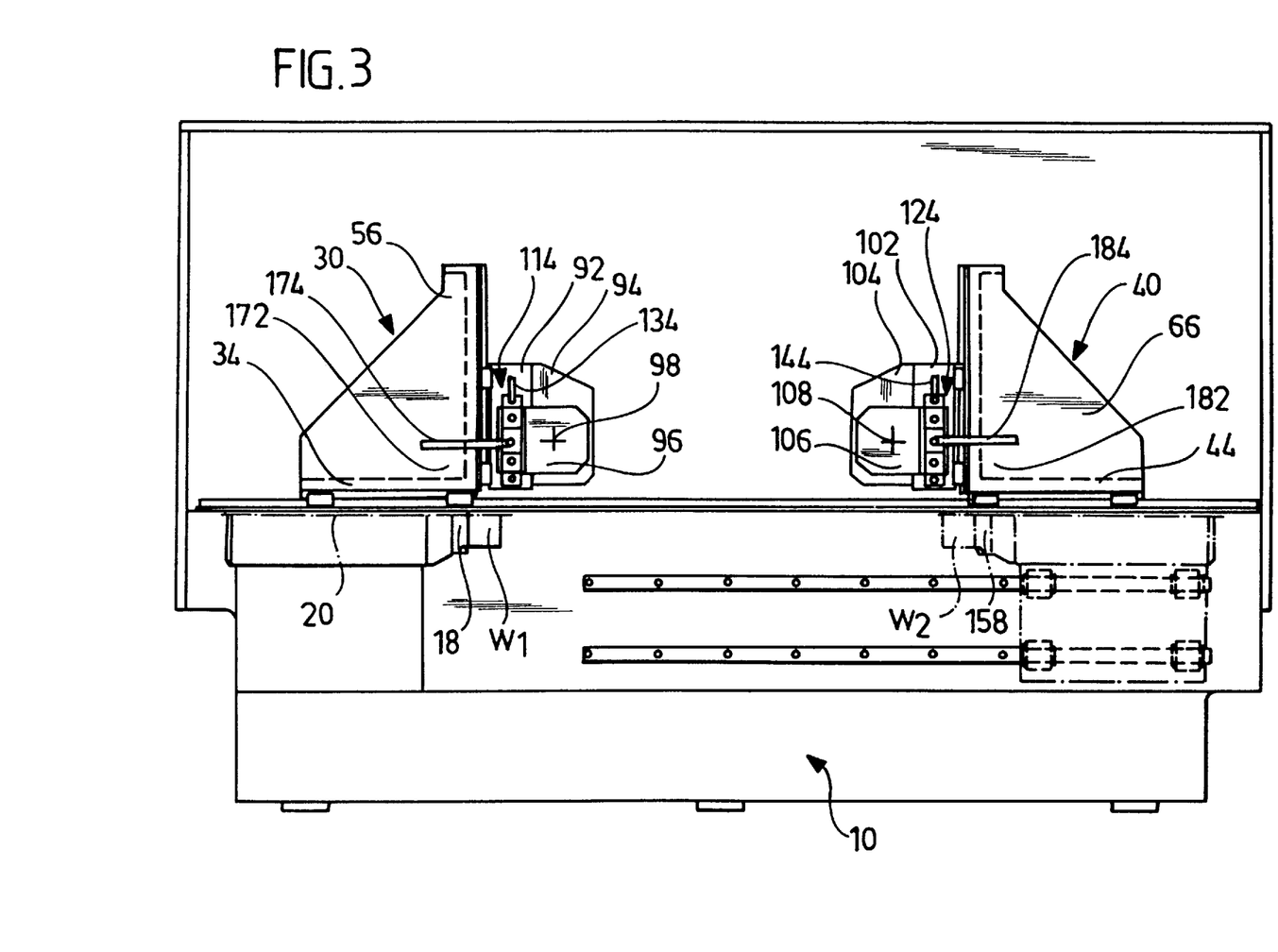
FIG. 3 shows a front view similar to FIG. 1 of the embodiment with tool carrier heads located in a second position.
Figure 4:
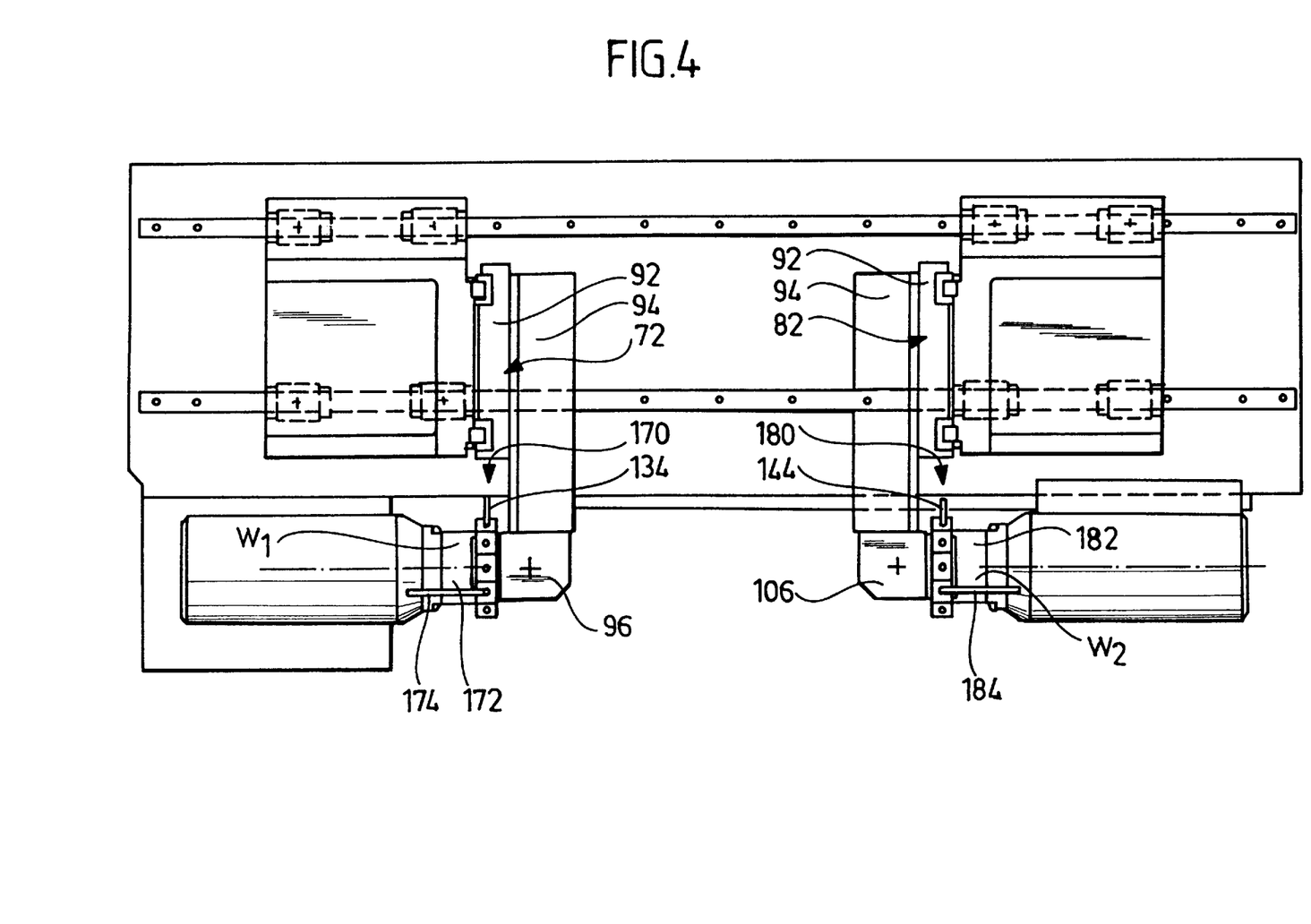
FIG. 4 shows a plan view corresponding to FIG. 2 with tool carrier heads located in the second position and FIG. 5 shows a section along line 5—5 in FIG. 2.
Figure 5:
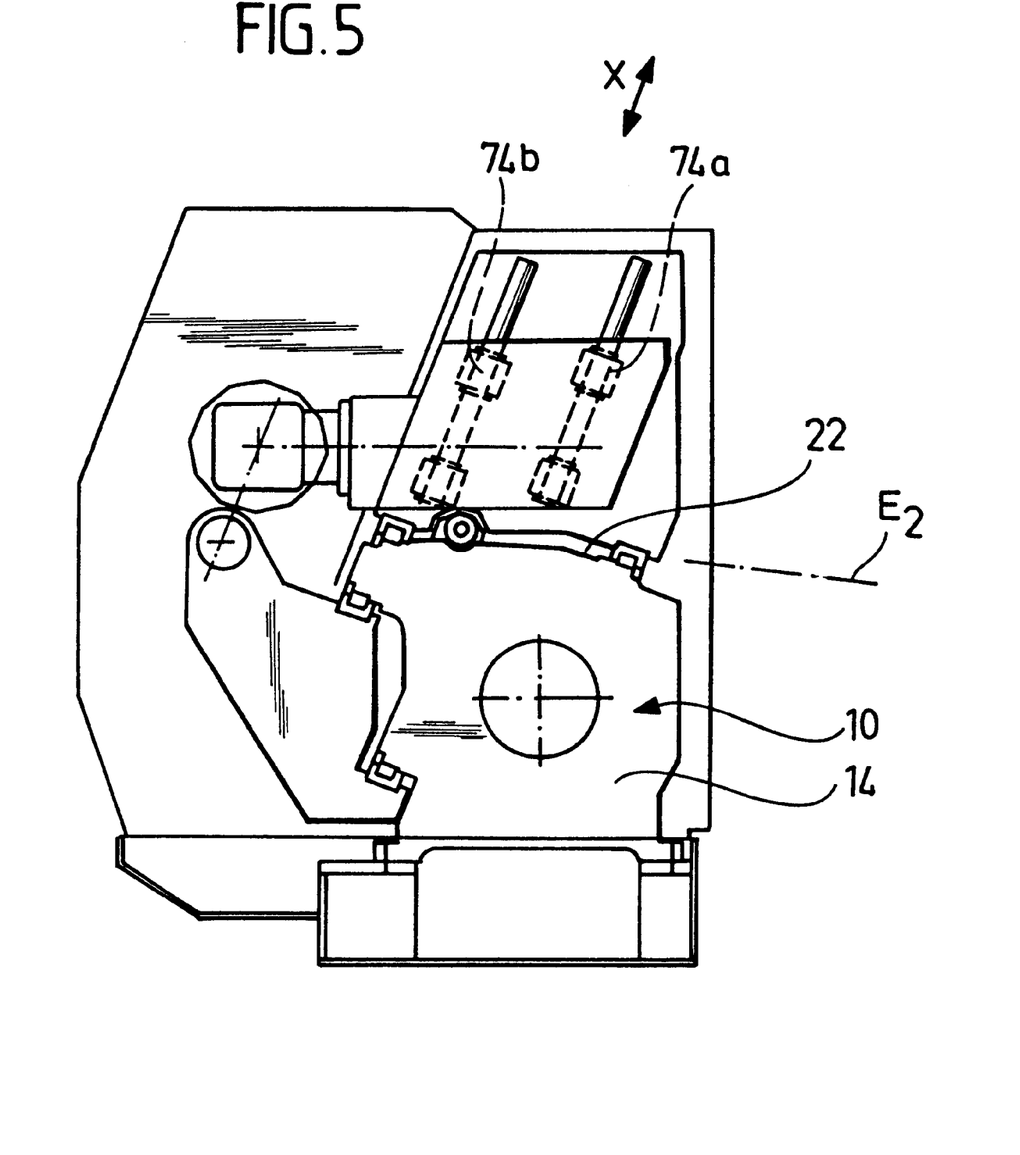

In addition, the turret heads 114, 124 can be brought into a position illustrated in FIGS. 3 and 4, in which the turret heads 114, 124 are located on a side of the respective turret housing 96, 106 facing away from the respectively other tool carrier system 40, 30. In this position, the turret heads 114, 124 are arranged between the respective slide system 32, 72 or 42, 82 and the respective spindle 18 or 158, wherein, in this case, the spindle 158 represents a customary counterspindle to the spindle 18 and can no longer be designed as a headstock.

Furthermore, the counterspindle 158 is guided in Z direction so as to be displaceable on Z guide means 154a, 154b which are held at the front side 16 of the base member 14.

In this position of the respective turret heads 114 and 124 a free space 170 and 180, respectively, surrounding the respective turret head 114 or 124 is provided between the respective slide system 32, 72 or 42, 82 and the respective turret head 114 or 124, this space allowing tools 134 and 144, respectively, extending radially to the respective turret axis 112 or 122 in the respective tool receiving means 116 or 126 to be used.

In addition thereto, a free space 172 and 182, respectively, is, however, also created in the second position in front of a respective end side 152 or 162 of the respective turret head 114 or 124, which is arranged so as to be located opposite the respective turret housing 96 or 106, this space being located between the respective slide system 32, 72 or 42, 82 and the corresponding spindle 18 or 158 and allowing tools 174 and 184, respectively, which extend parallel to the respective turret axis 112 or 122 to be inserted into the tool receiving means, these tools being designed, for example, as long drill rods and allowing bores to be introduced into the workpiece W1 and W2, respectively, inserted in the respective spindle 18 or 158.

The workpiece W2 is preferably the workpiece W1 transferred to the counterspindle 158 after machining in the spindle 18 with the tools 134, 174 of the turret head 114, wherein a machining of the rear side takes place by means of the tools 144, 184 of the turret head 124 while a machining of the front side is taking place in the case of workpiece W1.

In order to carry out all the machinings, the tool carrier systems 30 and 40 can, in accordance with the invention, be controlled independently by means of a control 190, wherein a control of the Z movement is brought about due to movement of the respective Z slide 32 or 42, of the X movement due to control of the respective X slide 72 or 82.

At the same time, the turret heads 114 and 124, respectively, can also be rotated about their respective turret axes 112 and 122 in a controlled manner as a result of the control 190 so that the desired tool 134 and 144, respectively, can be brought into use by means of the control.

In addition, the spindle 18 can preferably be actuated in the known manner for machining of the shaft.

In this respect, during the control of the tool carrier systems 30 and 40 attention has to be paid to the fact that a collision of the turret heads 114, 124 is avoided and so the control 190 must always take into consideration the position of the one tool carrier system 30 relative to the position of the other one since both move in Z direction on a collision-prone path.

In addition, it is advantageously provided for the displaceability of the counterspindle 158 acting as headstock during machining of the shaft in Z direction along the guide means 154*a* and 154*b* to also be used to position the counterspindle 158 exactly for its headstock operation.

In the case of the machining of the front and rear sides likewise possible with the inventive lathe, with which, for example, the workpiece W1 is machined in the spindle 18 on its front side then, due to displacement of the counterspindle 158 in Z direction along the guide means 154*a*, 154*b*, transferred to the counterspindle 158 which then moves back in Z direction into an end position illustrated, for example, in FIG. 4, the tool carrier systems 30 and 40 are likewise preferably controllable by the control 190 independently of one another in the manner described in order to carry out the individual machining steps in the spindle 18 and the counterspindle 158 independently of one another.

Furthermore, the spindle 18 and the counterspindle 158 are preferably C axis controlled in order to be able to carry out a correct transfer of the workpiece W1 from the spindle 18 to the counterspindle 158 and in order, on the other hand, to be able to carry out machinings of the workpieces W1 and W2 which are as comprehensive as possible.

During the machining of the front and rear sides the turret heads 114 and 124 can be used not only in the first but also in the second position. However, the second position is more advantageous for the case where tools 174 and 184, respectively, extending along the respective turret axes 112 and 122 are used since in this position the respective free space 172 or 182 is available in front of the respective end side 152 or 162 of the corresponding turret head 114 or 124 which allows a more or less collision-free positioning of the tool carrier systems 30 and 40, respectively, whereas in the first position during the movement of the respective tool carrier systems 30 and 40 in Z direction the extension of the respective tools 174 and 184 extending beyond the respective end side 152 or 162 of the corresponding turret head 114 or 124 would also have to be taken into consideration during the control of the movement in Z direction, on account of the collision-prone path of the respective Z slides 32 and 42, in order to obtain collisions. On the other hand, in the second position of the turret heads 114 and 124, respectively, consideration need merely be paid to the fact that the control of the respective Z slides 32 and 42 takes place in such a manner that the sides 132 and 142 of the respective slide systems 32, 72 and 42, 82 which face one another do not collide.

The transfer of the respective turret head 114 or 124 from the first position into the second position or from the second position into the first position may, in the simplest case, take place manually so that the respective turret 100 or 110 can be fixed on the respective housing 94 or 104 and is rotationally mounted and by means of manual rotation of the entire respective turret 100 or 110 the respective turret 100 or 110 can be transferred from the first position into the second position or vice versa and again be fixed in this position.

Alternatively thereto, it is, however, also conceivable to provide a drive so that pivoting of the respective turret 100 or 110 or of both turrets 100 and 110 from the first into the second position and vice versa can be carried out by the control 190.

In this respect, it is particularly advantageous when the pivoting movement about the respective pivot axis 98 or 108 takes place in accordance with a b axis numerically controlled by the control 190 so that the turret heads 114 and 124 can be positioned not only in the first and the second positions but also in optional intermediate positions in accordance with the respectively intended machining procedure.

What is claimed is:

1. Lathe comprising:
   a machine frame,
   at least one workpiece spindle, arranged on the machine frame and rotatable about a spindle axis,
   two tool carrier systems each comprising a slide system having at least a Z slide and a X slide and further comprising a tool carrier having a tool carrier head for several tools, said tool carrier system being movable relative to the machine frame in a Z direction parallel to the spindle axis, each of said tool carrier systems being guided independently of the other respective tool carrier system with its own Z slide in the Z direction on the machine frame,
   the tool carrier systems being arranged on the same side of the spindle axis and each tool carrier system being thereby movable in the Z direction on a path extending towards the other tool carrier system,
   each slide system having a guide plane for said X slide, said guide plane being defined by a X guide of said X slide and extending transversely to said spindle axis, each tool carrier system having the tool carrier head adapted to be positioned in a first position in relation to the respective slide system wherein said tool carrier head represents the structural component of the respective tool carrier system located closest to the other tool carrier system.

2. Lathe as defined in claim 1, wherein on at least one of said slide systems the extension of the said Z slide in the direction of the respectively other tool carrier system is less than the extension of said X slide of the respective slide system in the direction of the respectively other tool carrier system.

3. Lathe as defined in claim 2, wherein the Z slide has a X guide arranged on a slide member thereof such that said X guide is located closer to the respectively other tool carrier system than the respective slide member.

4. Lathe as defined in claim 1, wherein the slide systems of the tool carrier systems are movable in the Z direction towards one another.

5. Lathe, as defined in claim 4, wherein the slide systems are movable in the Z direction on identical guide means.

6. Lathe as defined in claim 1, wherein the tool carrier heads are aligned in a first position such that their tool receiving means allow use of tools extending in a surface extending transversely to the spindle axis at a point of intersection with the spindle axis.

7. Lathe as defined in claim 6, wherein the sung transversely to the spindle axis extend approximately parallel to one another at the point of intersection with the spindle axis.

8. Lathe as defined in claim 1, wherein the tool carrier head is arranged in the first position relative to the slide system supporting it such that the slide system forms a free space for tools extending away from the tool carrier head approximately in a direction transverse to the spindle axis.

9. Lathe as defined in claim 1, wherein at least one of the tool carrier heads is positionable in the first position relative to the slide system supporting it such that said tool carrier head projects beyond a side surface of the slide system located closest to the respectively other tool carrier system in the direction of the other tool carrier system.

10. Lathe as defined in claim 9, wherein both tool carrier heads are positionable relative to the slide system supporting them such that they project beyond a side surface of the slide system located closest to the respectively other tool carrier system in the direction of the other tool carrier system.

11. Lathe as defined in claim 1, wherein a counterspindle arranged so as to be located opposite the spindle is provided on the machine frame.

12. Lathe as defined in claim 11, wherein at least one of the spindle and the counterspindle are movable towards the other for the transfer of workpieces.

13. Lathe as defined in claim 1, wherein at least one of the tool carrier heads is adapted to be located in a second position relative to the slide system supporting it on a side of the tool carrier facing away from the other tool carrier system.

14. Lathe as defined in claim 13, wherein in the area of the tool carrier head the slide system forms a free space for tools extending approximately in the direction of the spindle axis.

15. Lathe as defined in claim 13, the tool carrier head is located in the second position in front of a side of the slide system facing towards the side of the corresponding spindle.

16. Lathe as defined in claim 13, wherein the tool carrier is movable relative to the X slide such that the tool carrier head is adapted to be brought from the first position into the second position.

17. Lathe as defined in claim 13, wherein the tool carrier head is adapted to be brought from the first position into the second position by way of a pivoting movement.

18. Lathe as defined in claim 17, wherein the tool carrier is mounted on the X slide so as to be pivotable.

19. Lathe as defined in claim 1, wherein the tool carrier is designed as a tool turret.

20. Lathe as defined in claims 19, wherein each tool turret has a turret head arranged on one side of a turret housing.

21. Lathe as defined in claim 20, wherein each turret head is pivotable about a turret axis in relation to the turret housing, said axis extending transversely to an X axis of the machine tool.

22. Lathe as defined in claim 21, wherein the turret axis extends approximately parallel to the Z axis.

23. Lathe as defined in claim 20, wherein the turret housing is pivotable about a pivot axis in relation to the X slide.

24. Lathe as defined in claim 23, wherein the turret head is adapted to be brought from the first position facing the other tool carrier system into the second position facing away from the other tool carrier system by way of pivoting of the turret housing about the pivot axis.

25. Lathe comprising:
a machine frame,
at least one workpiece spindle arranged on the machine frame and rotatable about a spindle axis,
two tool carrier systems movable relative to the machine frame in a Z direction parallel to the spindle axis and comprising tool carriers for several tools, each of said tool carrier systems being guided independently of the other respective tool carrier system so as to be movable with its own slide system in the Z direction on the machine frame,
the tool carrier systems being arranged on the same side of the spindle axis and each tool carrier system being thereby movable in the Z direction on a path extending towards the other tool carrier system, each slide system having an X slide guided on the Z slide by a X guide, said X guide being arranged in a guide plane facing the respectively other tool carrier system.

26. Lathe as defined in claim 25, wherein a guide plane, in which the X guide for the movement of the X slide relative to the Z slide is located on a side of a guide element of the Z slide located closest to the respectively other tool carrier system, said side facing the respectively other tool carrier system.

27. Lathe comprising a machine frame,
at least one workpiece spindle arranged on the machine frame and rotatable about a spindle axis,
two tool carrier systems each comprising a slide system having at least a Z-slide and a X-slide and further comprising a tool carrier head for several tools, said tool carrier system being movable relative to the machine frame in a Z-direction parallel to the spindle axis, each of said tool carrier systems being guided independently of the other respective tool carrier system so as to be movable with its own Z-slide in the Z-direction on the machine frame,
the tool carrier systems being arranged on the same side of the spindle axis and each tool carrier system being thereby movable in the Z-direction on a path extending towards the other tool carrier system, each slide system having a guide plane for said X-slide, said guide plane being determined by a X-guide of said X-slide and extending transversely to said spindle axis, each slide system having said X-slide guided on said Z-slide and arranged on a side of said Z-slide facing the other tool carrier system.

* * * * *